United States Patent [19]

Lockington

[11] Patent Number: 5,481,847
[45] Date of Patent: Jan. 9, 1996

[54] APPARATUS FOR, AND A METHOD OF, PLACING AN INSERT IN A CONTAINER

[75] Inventor: Derek C. Lockington, Oakham, Great Britain

[73] Assignee: Guinness Brewing Worldwide Limited, London, Great Britain

[21] Appl. No.: 317,784

[22] Filed: Oct. 4, 1994

Related U.S. Application Data

[63] Continuation of Ser. No. 52,632, Apr. 23, 1993, abandoned.

[30] Foreign Application Priority Data

Apr. 29, 1992 [GB] United Kingdom ................... 9209281

[51] Int. Cl.⁶ ................................................. B65B 61/00
[52] U.S. Cl. ............................. 53/128.1; 53/238; 53/258; 53/260; 493/94; 493/100
[58] Field of Search ................................. 493/89, 90, 92, 493/94, 100; 53/128.1, 129.1, 139.5, 238, 254, 258, 260, 263, 410, 474; 294/64.1

[56] References Cited

U.S. PATENT DOCUMENTS

| | | |
|---|---|---|
| 3,938,301 | 2/1976 | Rejsa et al. . |
| 4,203,269 | 5/1980 | Petersen ................................. 53/258 X |
| 4,596,110 | 6/1986 | Weiler ........................................ 53/410 |
| 4,749,219 | 6/1988 | Bolle et al. ............................. 294/64.1 |
| 4,762,354 | 8/1988 | Gfeller et al. ....................... 294/64.1 X |
| 4,815,779 | 3/1989 | Glessher et al. ......................... 294/64.1 |
| 4,852,247 | 8/1989 | Hawkswell .......................... 294/64.1 X |
| 4,887,351 | 12/1989 | Porterfield et al. .................. 294/64.1 X |
| 5,046,304 | 9/1991 | Alameda et al. ...................... 53/258 X |

FOREIGN PATENT DOCUMENTS

| | | |
|---|---|---|
| 2218080 | 4/1989 | United Kingdom . |
| 9106481A1 | 5/1991 | WIPO . |

*Primary Examiner*—John Sipos
*Assistant Examiner*—Daniel Moon
*Attorney, Agent, or Firm*—McCormick, Paulding & Huber

[57] ABSTRACT

An apparatus for, and a method of, placing an elongated insert 1 in a can 2 through a narrow top opening 6 has a head assembly 10 formed by a sleeve 21 slidable over a core 20. The core 20 has an inclined end face 23 with a vacuum suction port 25. The insert 1 is picked up from a delivery chute by vacuum suction through port 25 to be held on the end face 23 in a first orientation. The head assembly 10 is displaced with the insert attached thereto and moved into the can 2 whilst maintaining the insert 1 in its first orientation. The insert abuts the can base 3 and the sleeve 21 is displaced over the core 20 to abut the insert 1 and pivot the insert on the base 3 into a second position of orientation in which the opposed ends of the insert frictionally engage the can side wall 4 to retain the insert in the can.

3 Claims, 3 Drawing Sheets

APPARATUS FOR, AND A METHOD OF, PLACING AN INSERT IN A CONTAINER

This is a continuation of application Ser. No. 08/052,632 filed Apr. 23, 1993 abandoned.

TECHNICAL FIELD & BACKGROUND ART

The present invention relates to an apparatus for, and a method of, placing an insert in a container through a neck of the container. More particularly, the invention concerns such placement where the insert is elongated to have a dimension which is greater than the opening of the neck of the container and is carried by vacuum suction on a head assembly in a first orientation for and during its insertion through the neck, and where the head assembly is adjustable to move the insert to a second orientation within the container for final placement of the insert.

An example of apparatus of the kind discussed is disclosed in G.B. Specification 2,218,080A. Typically this latter apparatus can be used for placement of a hollow insert in a container in the formation of a beverage package as proposed in our European Patent Specification A-227 213.

In G.B. 2,218,080A the head assembly of the insert placement apparatus has a head part which is carried by, and rotatable relative to, a support part by control through a complex arrangement of pivotally connected links. Pivotal movement of the head part under control of the linkage serves to change the orientation of the head part relative to the support part and therefore can change the orientation in which an insert carried by the head part is presented initially for its insertion through the neck of the container and subsequently for its final placement within the container. The insert is releasably carried on the head part by suction that is applied through a vacuum pipe which interconnects between the head part and a vacuum source. The vacuum pipe is in the form of a flexible conduit which provides the head part with freedom to exhibit its pivotal movement and also provides adequate clearance for the displacement of the pivotal control links. Experience of using a head assembly constructed generally as indicated in FIG. 2 of G.B. 2,218,080A has shown that the complex pivotal control links and flexible vacuum pipe connection between the head and support parts are subject to rapid wear and deterioration during the successive placement of inserts at high frequency in a high speed container packaging line; consequently frequent servicing is required of the head assembly. It is an object of the present invention to provide an apparatus of the kind discussed for placing an insert in a container in which the head assembly has a relatively simple and reliable structure which can provide the required change in orientation of an insert for its placement in a container and will alleviate the complexity and relatively short service life of the prior proposal.

It is a further object of the present invention to provide an improved method of placing an insert of the aforementioned kind in a container and which method lends itself to the use of relatively simple and efficient equipment capable of a relatively long service life.

STATEMENTS OF INVENTION & ADVANTAGES

According to the present invention there is provided apparatus for placing an insert in a container through an open neck of the container where the insert is elongated to have a dimension which is greater than the opening of the neck and which includes supply means for delivering the insert to a pick-up station at which the insert is disposed in a first orientation; a head assembly relative to which the insert is disposed in said first orientation at the pick-up station, said head assembly being arranged to pick up the insert from the station by vacuum suction and carry the insert to position it within the container whilst maintaining the insert in said first orientation, and control means for the head assembly which control means when actuated displaces the insert from the head assembly and simultaneously adjusts the insert from its said first orientation to a second orientation within the container.

Further according to the present invention there is provided apparatus for placing an insert in a container through an open neck of the container where the insert has an elongated axis along which it is elongated to have a dimension which is greater than the opening of the neck, and which includes a head assembly having a longitudinal axis, the head assembly comprising a core part and a sleeve part on the core part, said parts being longitudinally displaceable relative to each other; a first of said core and sleeve parts having an end face inclined relative to said longitudinal axis and on which end face an insert is to be retained by vacuum suction and carried in a first orientation suitable for insertion together with the head assembly longitudinally through the open neck of the container, and control means for longitudinally displacing the second of said core and sleeve parts relative to the first of said parts, said displacement causing said second part to abut and displace the insert from the end face and adjustment of the insert to a second orientation within the container.

Still further according to the present invention there is provided a method of placing an insert in a container through an open neck of the container where the insert is elongated to have a dimension which is greater than the opening of the neck and which comprises positioning the insert at a pick-up station; picking up the insert at said station by vacuum suction on a head assembly while said insert is in a first orientation relative to the head assembly; maintaining the insert in said first orientation whilst moving the insert and head assembly into the container through the neck thereof, and controlling the head assembly within the container to displace the insert therefrom and simultaneously adjust the insert from said first orientation to a second orientation within the container.

By the present invention it is envisaged that the elongated insert which is to be placed within a container through a relatively narrow opening or neck of the container is disposed in a first orientation in which it is picked up by vacuum suction to be carried by a head assembly whilst being maintained in its first orientation. In this latter orientation of the insert the head assembly moves the insert through the open neck of the container. Once the insert is located within the container, the head assembly is adjusted to change the orientation of the insert within the container as appropriate to position the insert. In a typical embodiment where the insert is for the purpose discussed in the previously mentioned European Patent Specification 227,213, the insert will usually be carried in its first orientation to abut an end wall (usually a base) of the container so that when it is displaced by the head assembly into its second orientation, the insert pivots on the end wall as it moves into its second orientation. In the aforementioned typical embodiment the pivotal movement of the insert from its first to its second orientation causes the opposed ends of the insert over its elongated axis to move into frictional engagement with a side wall of the container (effectively to provide an interference fit between the insert and the interior of the container for maintaining the insert at a desired location within the container). The facility afforded by the present invention for the insert to be picked up in its first orientation on the head assembly in which orientation it is maintained by the head assembly to pass through the open neck of the container alleviates the necessity for the head assembly to pass through a sequence of adjustments which would otherwise require, following initial pick-up of the insert, the head assembly to adjust the insert into its first orientation suitable for insertion into the container. Furthermore following insertion and placement of the insert the apparatus of the present invention may require very simple and relatively small re-adjustment to reset as is necessary to pick-up a further insert in its first orientation. As a consequence the structure and controls of the head assembly in the present invention may be simplified in comparison with the pivotal type head assembly discussed in G.B. 2,218,080A; also the frequency with which successive inserts may be picked up and deposited in successive containers may be relatively greater than with the prior proposal (in view of the few adjustments which may be required of the head assembly of the present invention in following a cycle from pick-up of a first insert at a pick-up station to pick-up of the following insert at the station as compared with the number of adjustments required of the head assembly in the relatively more complex cycle exhibited by the prior proposal).

Having a relatively simple structure in mind, it is preferred that the head assembly in the present invention is formed with a core which is received within a longitudinally extending sleeve so that the sleeve and core are longitudinally displaceable relative to each other. The core has an end face which is inclined relative to its longitudinal axis and on which an insert is to be retained by vacuum suction to be carried in a first orientation suitable for insertion together with the, or a leading part of the, head assembly through the open neck of the container. Control means of the head assembly serves to displace the sleeve longitudinally relative to the core so that the sleeve abuts the insert to displace it from the end face and in so doing causes the insert to abut a wall of the container and be adjusted to its second orientation within the container. From this preferred arrangement it will be appreciated that the inclination of the end face of the core (or, in the alternative arrangement envisaged by the broad concept of the present invention, the inclination of the end face of the sleeve) will pick up the insert in its first orientation in which it is maintained relative to the head assembly so that longitudinal displacement of the head assembly into the open neck of the container will permit the insert to pass through the relatively narrow open neck of the container. For the pick-up of an insert envisaged by this preferred arrangement, the insert will usually be presented to an inclined flat end face of the head assembly with its elongated axis generally parallel to that end face and with its elongated axis subtending a minimum acute angle with the longitudinal axis of the head assembly. Usually the end face of the head assembly will abut a flat surface of the insert for the latter to be held by vacuum suction against the inclined end face and so that the co-operation between the inclined end face and the insert automatically maintains the latter in its first orientation in which the insert is presented by the head assembly to pass through the open neck of the container. In the preferred structure of head assembly having a core longitudinally slidable within and relative to a sleeve, it will be appreciated that the required longitudinal displacement between the core and the sleeve may be simply effected by appropriate cam and cam followers, fluid pressure operated piston and cylinder devices, electrically operated solenoids or otherwise as will be apparent to persons skilled in the relevant art.

The supply means for delivering the insert to the pick up station will usually present the insert so that its elongated axis is inclined as appropriate for the first orientation at which it is to be picked up. Conveniently therefore the supply means will cause the insert to follow an inclined path to its pick up station. For example, it may comprise a simple chute along which an array of inserts are delivered successively to the pick up station or it may comprise a dynamic feed for the inserts such as an index plate or other means which rotates, either continuously or intermittantly on an incline, and is synchronised to carry and deliver inserts to be picked up by the head assembly at the pick up station.

The present invention also provides a head assembly for placing an insert in a container and which is to be mounted for displacement substantially along a longitudinal axis thereof, the assembly comprising a core and a longitudinally extending sleeve on the core, said core and sleeve being longitudinally displaceable relative to each other; the core having an end face inclined relative to said longitudinal axis and which end face has associated therewith means through which vacuum suction is to be applied for retaining and carrying an insert on said end face, and wherein said sleeve is longitudinally displaceable relative to the core for displacing an insert carried by the head assembly from the inclined end face.

DRAWINGS

One embodiment of an apparatus for placing an insert in a container and a method of such placement will now be described, by way of example only, with reference to the accompanying illustrative drawings, in which.

DETAILED DESCRIPTION OF DRAWINGS

Figure 1:
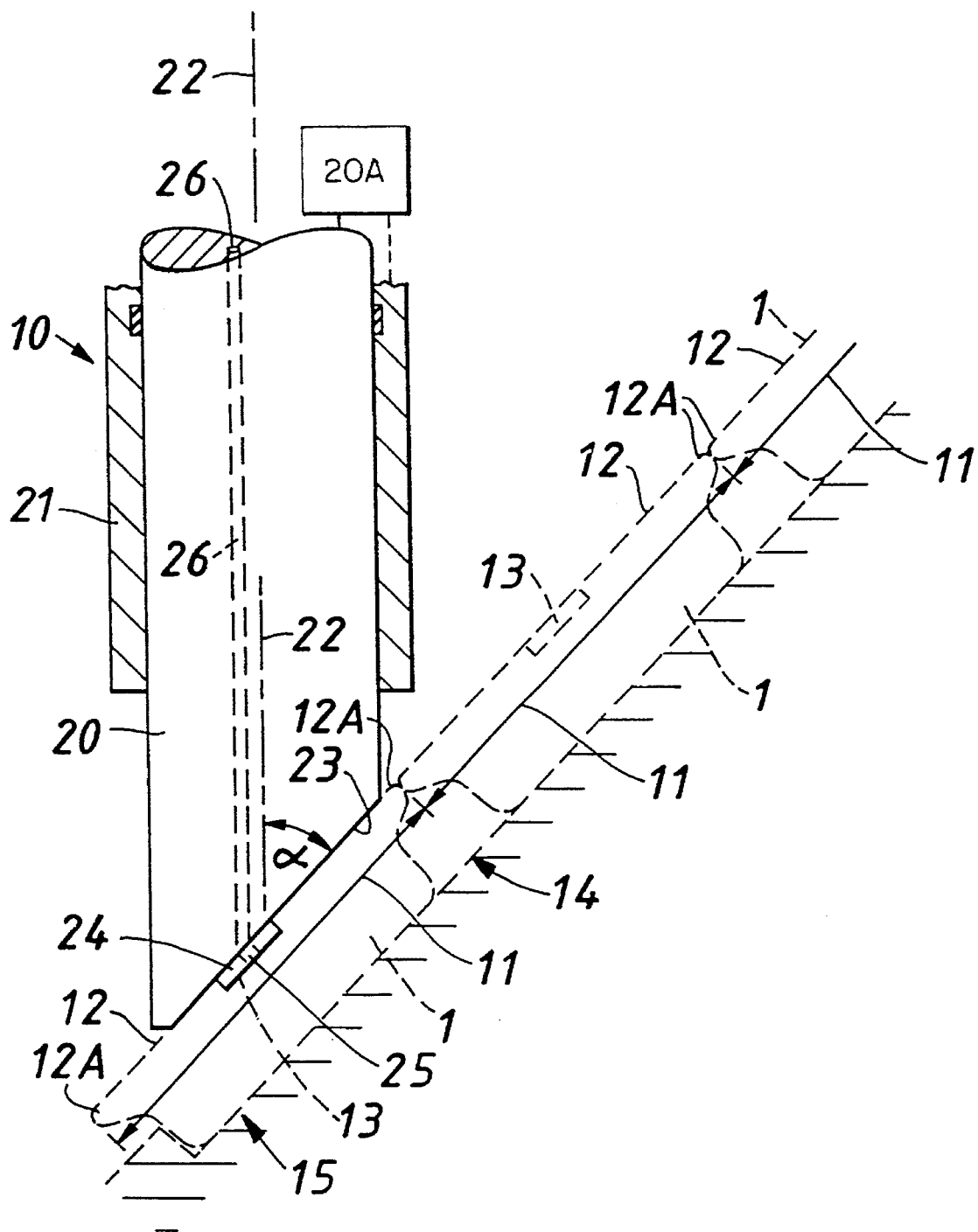
FIG. 1 illustrates, in part section, a head assembly of the apparatus picking up an insert in a first orientation suitable for the insert to be inserted into an open topped container.

In the illustrated embodiment a hollow plastics, relatively rigid insert 1 (shown in broken lines) is to be placed within a conventional thin walled metal alloy can 2 in the formation of a beverage package which, conveniently, may be as described and illustrated in our European Patent No. 227, 213. Typically the can 2 will have a base 3 (usually part spherically convex within the can) upstanding from which is a cylindrical tubular wall 4. The upper end of the wall 4 has a neck 5 which forms a restricted circular open top 6 through which the insert 1 is to be placed in the can by a head assembly 10. The insert 1 has an axis 11 along which it is elongated to have a dimension greater than the diameter of the top opening 6 while the dimensions of the insert 1 in the direction normal to its elongated axis 11 are less than the diameter of the top opening 6. In practice the length of the insert 1 over its elongated axis 11 will be slightly greater than the internal diameter of the cylindrical wall 4 of the can 2. The insert 1 has a substantially flat top face 12 within which is located a centrally disposed recess 13.

Referring now to FIG. 1, an array of inserts 1 are fed successively and with their elongated axes 11 in alignment down an inclined track of a chute shown generally at 14 to a pick-up station 15. The insert 1 at the pick-up station 15 is positioned in a predetermined orientation with respect to the chute track 14 so that its top face 12 is presented outwardly of the track. Conveniently the inserts 1 are displaced along the chute 14 by gravity feed.

The head assembly 10 has a cylindrical core 20 which is received as a close sliding fit within a cylindrical sleeve 21. The axes of the core and sleeve coincide with a longitudinal axis 22 of the head assembly. The sleeve 21 is longitudinally displaceable relative to the core 20 and if required a keyway (not shown) or other means may be provided between the core and sleeve to restrain those components from rotating relative to each other. The core 20 has a flat end face 23 which is inclined at a minimum acute angle α with respect to the axis 22 of the head assembly. Projecting from the face 23 is a generally centrally disposed boss 24 having a port 25 which communicates with a passage 26 extending longitudinally through the core 20. The passage 26 can be controlled to open and close to communication with a vacuum pump (not shown).

The head assembly 10 is displaceable as a whole relative to the chute 14 and with the sleeve 21 withdrawn over the core 20 to a position remote from the end face 23 as shown in FIG. 1. Control means 20A are provided for controlling displacement of the head assembly 10 and relative displacement between the core 20 and sleeve 21 in a manner which will subsequently be described—such control means will be apparent to persons skilled in the art and as such need not be discussed in detail although typically they will be fluid pressure operated such as piston and cylinder devices, mechanical such as cam track and cam followers or electrical such as solenoid devices.

In a preferred installation the head assembly 10 will be maintained and displaced with its axis 22 vertical and as shown in FIG. 1 for its end face 23 to approach the top face 12 of the insert 1 located at the pick-up station 15 of the chute and at the commencement of an insert fitting cycle. The assembly 10 is controlled in its displacement for the boss 24 on the end face 23 to move into complementary engagement with the recess 13 of the insert 1 at the pick-up station so that the end face 23 is substantially in face-to-face abutment with the insert top face 12. In this latter condition the elongated axis 11 subtends the angle α with the head assembly axis 22 and the chute 14 is appropriately inclined to reflect the aforementioned engagement. The conduit 26 is now connected to the vacuum pump to apply suction at the port 25 causing a pressure differential which holds the insert 1 with its upper face 12 firmly against the core end face 23 so that the insert is retained on the core 20 of the head assembly in a first orientation with respect to the core.

Figure 2:
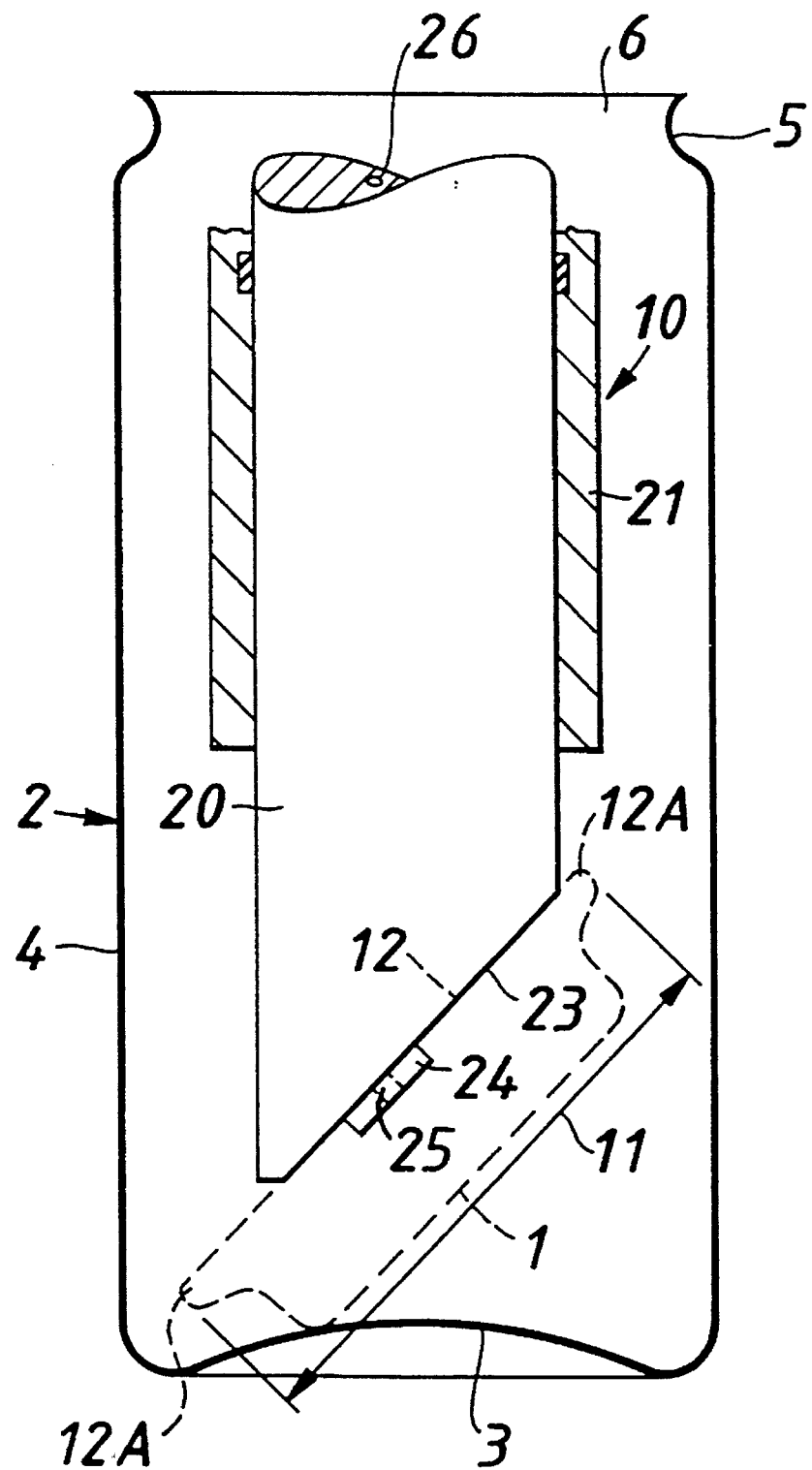
FIG. 2 shows the head assembly and insert carried thereby received within the open topped container while the insert is maintained in its first orientation.
Figure 3:
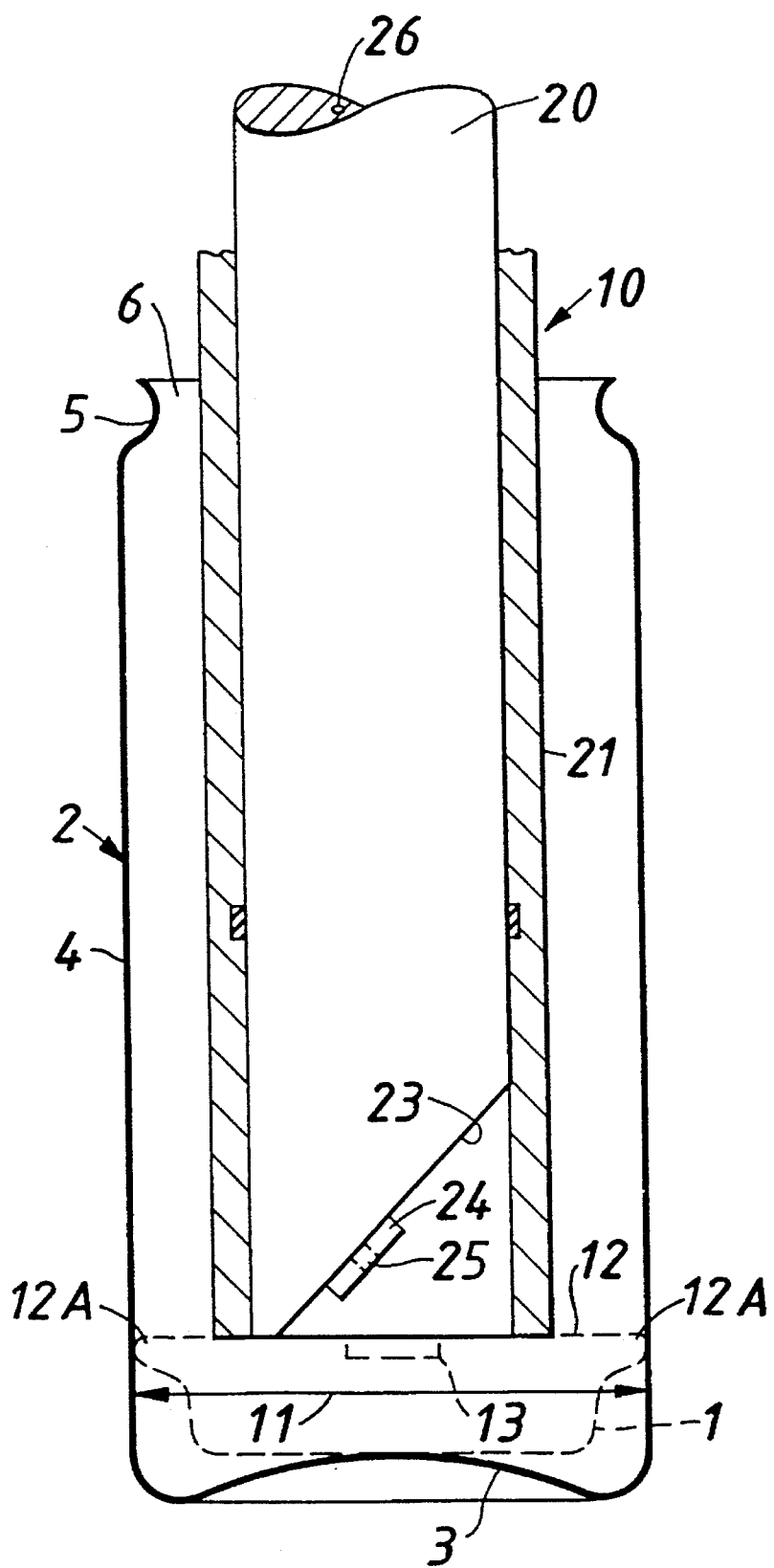
FIG. 3 illustrates the head assembly having been adjusted to displace the insert into its second orientation for its placement within the container.

The head assembly 10 is now raised as a whole to carry and lift the insert 1 from the chute 14 so permitting the immediately following insert in the chute to fall down the track to the pick-up station 15. The insert 1 is carried in its first orientation on the core 20 and moved by the head assembly to be positioned over the top opening 6 of a can 2. Typically, the can 2 will be moving along a conveyor (not shown) such as on a continually rotating turret type machine and the movement of the head assembly 10 will be synchronised with that of the can to maintain the aforementioned overlying relationship during the fitting of the insert into the can. When the insert overlies and co-incides with the top opening, the head assembly is lowered for its bottom end and the insert it carries to pass through the open top 6 to the position shown in FIG. 2 where the insert 1 abuts the bottom 3 of the can. With the insert in this latter condition, the control means of the head assembly 10 is actuated to slide the sleeve 21 axially over the core 20 and into abutment with the upper face 12 of the sleeve. At this stage of the cycle the vacuum suction at the port 25 may be discontinued. The abutment of the sleeve 21 with the insert 1 displaces the insert from the core end face 23 and causes the insert to rotate as a whole within the can 2 and move into a second orientation in which its upper face 12 is generally parallel with the can base 3. In the second orientation of the insert 1, opposite ends 12A of the insert over its elongated axis 11 frictionally or interferingly engage with the side wall 4 of the can, effectively to secure the insert within the can. The head assembly 10 is now withdrawn from the can and the sleeve 21 retracted over the core 20 from its end face 23 in readiness for the head assembly to approach and pick up a further insert 1 from the chute 14 as it commences a further cycle for fitting another insert in another can on the conveyor.

Although we have referred to the sleeve and core of the head assembly as being cylindrical, it will be appreciated that this is not essential, for example these components may be of polygonal shape in section and furthermore the sleeve does not necessarily have to be a solid component which extends fully about the periphery of the core.

I claim:

1. A head assembly for placing an insert in a container and which assembly is to be mounted for displacement substantially along a longitudinal axis thereof, the assembly comprising a core and a longitudinally extending sleeve on the core, said core and sleeve being longitudinally displaceable relative to each other; the core having an end face which is fixed relative thereto and is inclined relative to said longitudinal axis and which end face has means for applying a vacuum suction therethrough for retaining and carrying an insert on said end face, and wherein said sleeve is displaceable along said longitudinal axis and relative to the core for displacing an insert carried by the inclined end face from that end face.

2. Apparatus as claimed in claim 1 in which the end face is substantially flat.

3. Apparatus as claimed in claim 1 in which the core is received within the sleeve for the sleeve to extend around the periphery of the core.

* * * * *

UNITED STATES PATENT AND TRADEMARK OFFICE
CERTIFICATE OF CORRECTION

PATENT NO. : 5,481,847
DATED : January 9, 1996
INVENTOR(S) : Derek C. Lockington It is certified that error appears in the above-indentified patent and that said Letters Patent is hereby corrected as shown below:

On the title page, item [30]
"Foreign Application Priority Data:

Delete "9209281" and substitute--9209281.6--.

Signed and Sealed this

Fourth Day of June, 1996

Attest:

BRUCE LEHMAN

*Attesting Officer*     Commissioner of Patents and Trademarks